(12) United States Patent
Konanur et al.

(10) Patent No.: US 10,109,414 B2
(45) Date of Patent: *Oct. 23, 2018

(54) CASCADED COILS FOR MULTI-SURFACE COVERAGE IN NEAR FIELD COMMUNICATION

(71) Applicant: Intel Corporation, Santa Clara, CA (US)

(72) Inventors: Anand S. Konanur, Sunnyvale, CA (US); Ulun Karacaoglu, San Diego, CA (US); Songnan Yang, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 186 days.

This patent is subject to a terminal disclaimer.

(21) Appl. No.: 14/971,288

(22) Filed: Dec. 16, 2015

(65) Prior Publication Data

US 2016/0189860 A1 Jun. 30, 2016

Related U.S. Application Data

(63) Continuation of application No. 13/709,584, filed on Dec. 10, 2012, now Pat. No. 9,281,118.

(51) Int. Cl.
*H01Q 7/08* (2006.01)
*H01F 38/14* (2006.01)
(Continued)

(52) U.S. Cl.
CPC .............. *H01F 38/14* (2013.01); *H01Q 1/273* (2013.01); *H01Q 7/00* (2013.01); *H01Q 7/06* (2013.01);
(Continued)

(58) Field of Classification Search
None
See application file for complete search history.

(56) References Cited

U.S. PATENT DOCUMENTS

| 4,549,186 A | 10/1985 | Gross et al. |
| 7,466,283 B2 | 12/2008 | Kamitani et al. |

(Continued)

FOREIGN PATENT DOCUMENTS

| CN | 101491112 A | 7/2009 |
| CN | 102668238 A | 9/2012 |

(Continued)

OTHER PUBLICATIONS

Extended European Search report received for European Patent Application No. 13862781.5, dated Jun. 16, 2016, 9 pages.

(Continued)

*Primary Examiner* — Trinh Dinh
(74) *Attorney, Agent, or Firm* — Schiff Hardin LLP

(57) ABSTRACT

Described herein are techniques related to near field coupling and wireless power transfers. A device may include a cascaded coil antenna to include a first coil antenna that is connected in series with a second coil antenna. The first and second coil antennas are independent antennas prior to cascading and are located in different surfaces of the device to establish near field coupling through front side, top side, bottom side, or corner side of the portable device. Furthermore, a flux guide may be placed in the cascaded coil antenna to facilitate magnetic flux at the first coil antenna and the second coil antenna to induce current of the same phase during receive mode. During transmit mode, the flux guide facilitates the magnetic flux at the first coil antenna and the second coil antenna to generate magnetic fields of the same direction.

16 Claims, 8 Drawing Sheets

(51) Int. Cl.
  *H01Q 7/06* (2006.01)
  *H01Q 1/27* (2006.01)
  *H01Q 7/00* (2006.01)
  *H02J 50/27* (2016.01)
  *H02J 50/23* (2016.01)
  *H02J 50/12* (2016.01)
  *H02J 50/80* (2016.01)
  *H04B 5/00* (2006.01)

(52) U.S. Cl.
  CPC .............. *H02J 50/12* (2016.02); *H02J 50/23* (2016.02); *H02J 50/27* (2016.02); *H02J 50/80* (2016.02); *H04B 5/0081* (2013.01); *H04B 5/0031* (2013.01); *H04B 5/0037* (2013.01)

(56) References Cited

U.S. PATENT DOCUMENTS

| | | | |
|---|---|---|---|
| 8,849,195 | B2 | 9/2014 | Drihara et al. |
| 9,281,118 | B2* | 3/2016 | Konanur ............... H01F 38/14 |
| 2007/0205291 | A1 | 9/2007 | Aramaki et al. |
| 2008/0165063 | A1 | 7/2008 | Schlub et al. |
| 2009/0033567 | A1 | 2/2009 | Takeuchi |
| 2010/0309088 | A1 | 12/2010 | Hyvonen et al. |
| 2011/0140671 | A1 | 6/2011 | Kim et al. |
| 2012/0249384 | A1 | 10/2012 | Kaikkonen et al. |
| 2012/0249396 | A1* | 10/2012 | Parsche ............... H01Q 1/243 343/866 |
| 2012/0311356 | A1 | 12/2012 | Tan |
| 2013/0181805 | A1* | 7/2013 | Saito ............... H01Q 1/2216 336/84 M |
| 2013/0267170 | A1 | 10/2013 | Chong et al. |
| 2014/0035793 | A1* | 2/2014 | Kato ............... H01Q 1/243 343/867 |
| 2014/0218261 | A1 | 8/2014 | Ito |
| 2014/0306656 | A1 | 10/2014 | Tabata et al. |
| 2014/0346886 | A1 | 11/2014 | Yang et al. |

FOREIGN PATENT DOCUMENTS

| | | |
|---|---|---|
| EP | 2573871 A1 | 3/2013 |
| JP | 2007-180805 A | 7/2007 |
| KR | 10-2011-0127287 A | 11/2011 |
| WO | 2008/003592 A1 | 1/2008 |
| WO | 2012/033031 A1 | 3/2012 |
| WO | 2012/091108 A1 | 7/2012 |
| WO | 2014/092793 A1 | 6/2014 |

OTHER PUBLICATIONS

Office Action received for Chinese Patent Application No. 201380058851.5, dated Oct. 31, 2016, 11 Pages of Chinese Office Action including 4 pages of English Translation.
International Search Report and Written Opinion received for PCT Patent Application No. PCT/US2013/048038, dated Oct. 11, 2013, 10 pages.
International Preliminary Report on Patentability and Written Opinion received for PCT Patent Application No. PCT/US2013/048038, dated Jun. 25, 2015, 7 pages.
Office Action dated May 28, 2018 for Chinese Application No. 201610086169.2.

* cited by examiner

CASCADED COILS FOR MULTI-SURFACE COVERAGE IN NEAR FIELD COMMUNICATION

BACKGROUND

Recently, technologies have arisen that allow near field coupling (such as wireless power transfers (WPT) and near field communications (NFC)) between electronic devices in close proximity to each other and more particularly, thin portable electronic devices. Both near field coupling functions use radio frequency (RF) antennas in each of the devices to transmit and receive electromagnetic signals. Because of user desires (and/or for esthetic reasons) many of these portable devices are small (and becoming smaller), and tend to have exaggerated aspect ratios when viewed from the side. As a result, many of these thin portable devices incorporate flat antennas, which use coils of conductive material as their radiating antennas for use in near field coupling functions.

A conventional NFC antenna configuration in the thin portable devices includes a limited operational function. For example, the thin portable device is limited to share information through front side or back side of the thin portable device using different coil antenna with different NFC modules. Accordingly, an antenna configuration may be implemented to establish NFC and/or WPT in multiple directions or surfaces to provide user convenience in case of information transfer between portable devices.

Figure 1:
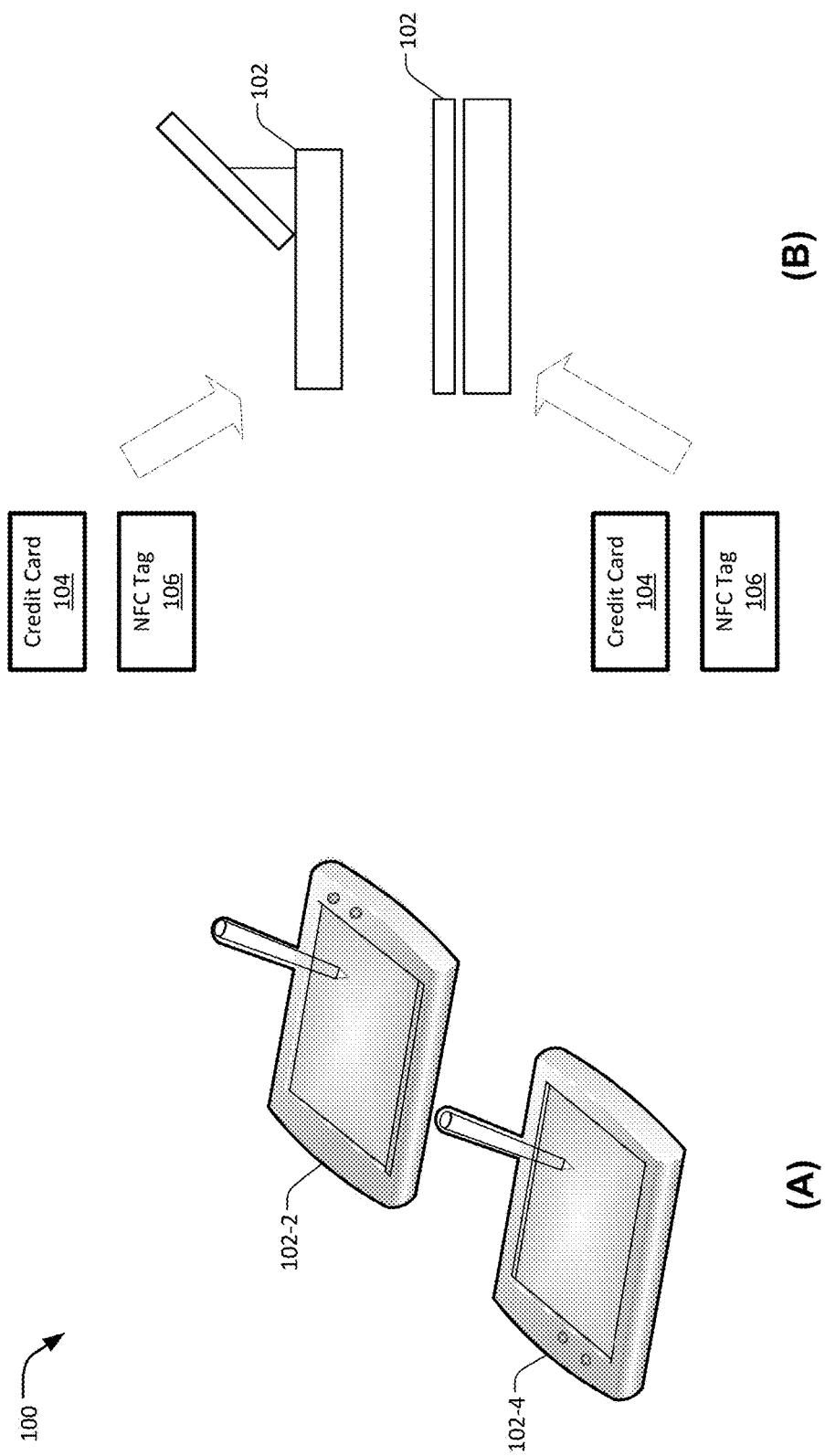
FIG. 1 illustrates portable devices in an example near field coupling arrangement.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for coupling antennas of devices and more particularly for coupling coil antennas of thin portable electronic devices for improving near field coupling capabilities of the devices. Near field coupling includes (by way of illustration and not limitation) wireless power transfer (WPT) and/or near field communications (NFC) capabilities of the portable devices. For example, the portable device includes a first coil antenna that is connected in series—through a connecting wire such as coaxial cable—to a second coil antenna to form a cascaded coil antenna arrangement. In this example, the series connection means a) positive terminal of the first coil antenna and a negative terminal of the second coil antenna are connected to inner conductor and outer metallic shield, respectively, of the coaxial cable acting as a transmission line, and b) the negative terminal of the first coil antenna is connected or linked by another connecting wire line to the positive terminal of the second coil antenna to complete the cascading of the two coil antennas.

In an implementation, the two coil antennas of the cascaded coil antenna are separate and independent from one another if not for the connecting wire that completes the cascading. In other words, they can be placed separately at any surface of the portable device such as top, side, rear, or bottom surfaces to conduct near field coupling at these surfaces.

In an implementation, the connecting wire is configured to avoid parasitic loop between the terminals of the cascaded coil antenna. For example, the connecting wire line between the negative terminal of the first coil antenna and the positive terminal of the second coil antenna is curled or twisted with the coaxial cable to minimize availability of parasitic loop between them. Furthermore, a single NFC module may be implemented for the cascaded coil antenna.

In an implementation, during receiving mode by the portable device, currents induced at the first coil antenna and the second coil antenna of the cascaded coil antenna may include the same phase. Similarly, during transmitting mode, magnetic fields that are generated by the cascaded coil antenna may include the same direction. In this implementation, a highly permeable flux guide (e.g., ferrite material) may be placed to cover a top portion of the first coil antenna and the ferrite material continues to the other top portion of the second coil antenna that may be located at the opposite surface. The ferrite material may facilitate magnetic flux to induce currents with the same phase during the receiving mode, and to generate magnetic fields of the same direction during transmitting mode. In other implementations, both ends of the ferrite material may be inserted through slots at the first coil antenna and the second coil antenna to allow additive flux linkage.

FIG. 1 illustrates an example arrangement 100 of portable devices for near field coupling. More particularly, users may have a desire to operate near field coupling enabled portable electronic devices and/or other devices in certain ergonomically convenient manners. Examples of such portable devices include (but are not limited to) mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like.

In an implementation, FIG. 1A shows a so-called "NFC bump" where two users (not shown) "bump" their NFC-enabled portable devices 102-2 and 102-4 together in an edge-to-edge or head-to-head manner to perform NFC-related information sharing functions. In other implementations, a corner-to-corner (not shown), or a front-to-back (not shown), or a back-to-back (not shown) manner may be performed for the "NFC bump." FIG. 1A shows an often desired side-by-side arrangement of the portable devices 102 for NFC and/or WPT purposes.

In an implementation, the portable devices 102 may include an antenna configuration to perform and/or establish near field coupling through front side, or top side, bottom side, rear side, or corner side of the portable devices 102. For example, the portable device 102-2 may establish NFC and/or WPT when the portable device 102-4 is placed on top of the portable device 102-2. In this example, the portable device 102-2 may receive information (e.g., data packets) from the portable device 102-4 through the established NFC. Further, the portable device 102-2 may charge power to the portable device 102-4 through the front side of portable device 102-2. Similarly, the portable device 102-4 may establish NFC and/or WPT when the portable device 102-2 is placed on top of the portable device 102-4. The above example for establishing NFC and/or WPT through the front side of the portable devices 102 may similarly apply to the top side, bottom side or corner side operations.

FIG. 1B illustrates the portable devices 102 to accept information from a credit card 104, an NFC tag 106, or other similar device when the credit card 104/NFC tag 106 is placed at the front side (i.e., above palm rest area) when the portable device 102 is at clam shell mode. Similarly, FIG. 1B shows the credit card 104/NFC tag 106 that is placed at rear side (i.e., opposite surface of keyboard area) when the portable device 102 is at tablet mode. In these two implementations, a cascaded coil antenna (not shown) may be installed to include a first coil antenna (not shown) at the palm rest area (not shown) of keyboard to establish the near field coupling in the first illustration (i.e., clam shell mode), and another coil antenna (not shown) may be installed at the rear side (not shown) of the portable device 102 for the tablet mode implementation.

Figures 2A, 2B:
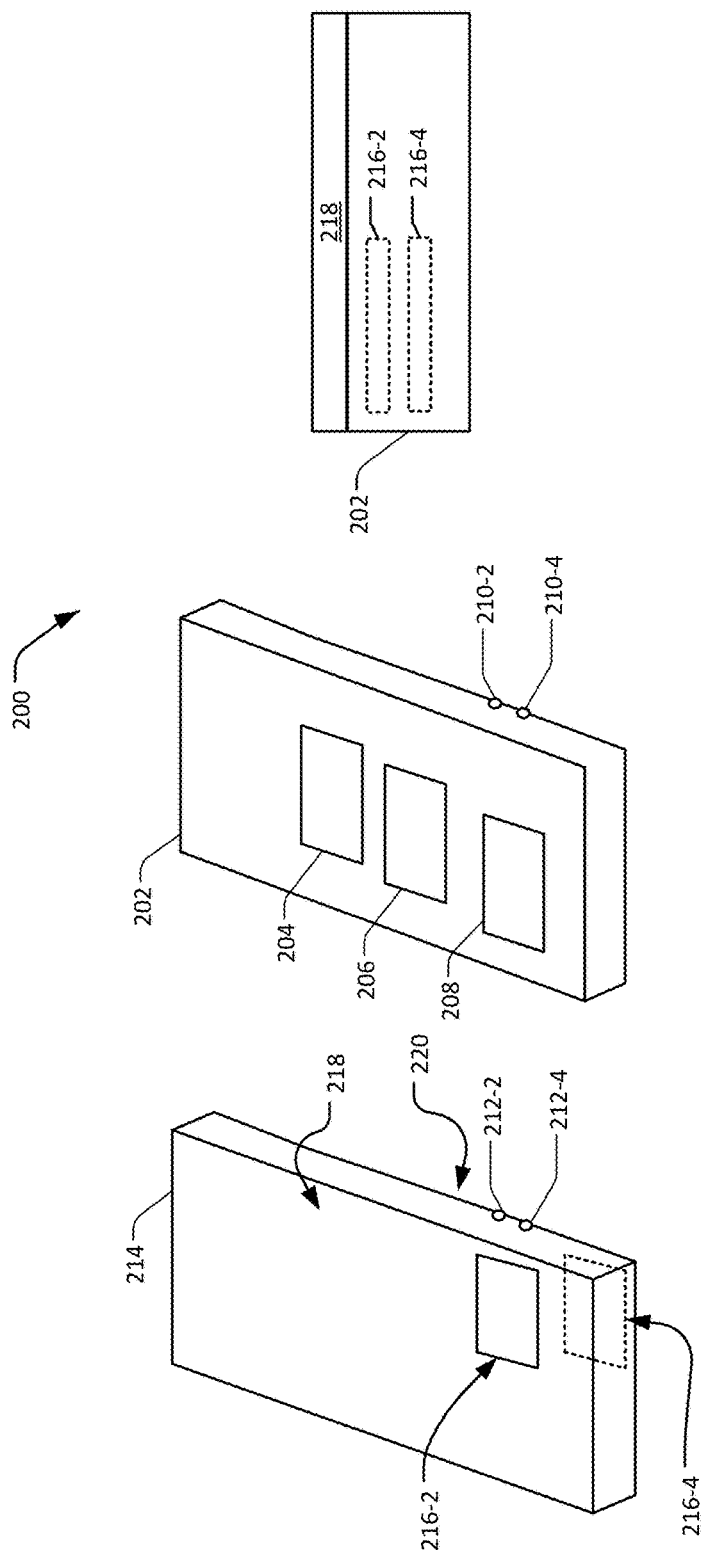
FIG. 2A illustrates a top plan view of a partially disassembled portable device.
FIG. 2B illustrates a side view of a partially disassembled portable device.

FIG. 2A illustrates a top plan view 200 of a partially disassembled portable device 102. The emerging technologies related to near field coupling enable many appealing experiences for users of the portable device 102. For example, the portable device 102 may include the cascaded coil antenna in its design, so that (in part) the portable device 102 may possess the thin aspect ratios and small form factors sought by users. Moreover, the cascaded coil antenna may allow for comparative ease in mechanical integration into the thin portable device 102 (when considering mechanical factors in isolation from other considerations such as, the ability of the coils of other portable devices 102 to couple with one another). For instance, integrating a flexible printed circuit (FPC), which incorporates the coil antenna, into a thin portable device 102 may minimize the increase in the thickness of the portable device 102.

With continuing reference to FIG. 2A, the drawing illustrates an example device 202 that includes a housing of at least two surfaces (e.g., two parallel surfaces). Between the two parallel surfaces may contain metallic components at the portable device 102. For example, the metallic components may include a battery 204, a mother board 206, and a camera 208. Other metallic components such as a heat sink hardware, printed circuit boards, processor(s), hard drives, memory, etc. may be included at the device 202. Further, a contact point 210 may be used to establish electrical connection through a contact point 212 at a device 214. For example, induced currents during receive mode at the device 214 may be transmitted for processing (e.g., amplification) at the device 202 through the contact points 210 and 212. In other implementations, the at least two surfaces of the housing in the device 202 may include a top surface and a bottom surface that may not necessarily be parallel to each other, or contain the metallic components. For example, the top surface and the bottom surface may define an acute angle that is located at an edge of the portable device 102.

In an implementation, the device 214 may include at least two separate and independent continuous loop of coil antenna 216 that are connected in series to form a cascaded coil antenna 216. In this implementation, the cascaded coil antenna 216 is mounted on, embedded in, or otherwise associated with different surfaces of the device 214. The cascaded coil antenna 216 may include a dedicated antenna for NFC and/or WPT purposes. In other words, the cascaded coil antenna 216 may be configured to operate on a separate resonant frequency (e.g., 13.56 MHz to implement NFC and/or WPT operations), and independent from another antenna that uses standard frequencies used in wireless communications (e.g., 5 GHz for WiFi signals).

In an implementation, the cascaded coil antenna 216 may include a first coil antenna 216-2 that is connected in series with a second coil antenna 216-4. In this implementation, the first coil antenna 216-2 and the second coil antenna 216-4 may each include multiple inner loops and terminals (e.g., positive and negative terminals). In this implementation, the terminals of the first coil antenna 216-2 and the second coil antenna 216-4 are connected in series provide a single coil antenna (i.e., cascaded coil antenna 216) as seen by a NFC module (not shown). Furthermore, the coil antennas 216 may be separately located at different surfaces (e.g., upper surface 218 or rear surface 220, respectively) of the portable device 102 to facilitate near field coupling at the front side or rear side of the portable device 102. In other implementations, the cascaded coil antenna 216 may be configured to establish near field coupling at corner side, bottom side, at edge, or top side of the portable devices 102.

FIG. 2B shows a side view of In an implementation, the cascaded coil antenna 216 may include a flux guide 218 to guide or lead magnetic flux to the first coil antenna 216-2 or the second coil antenna 216-4 depending upon which coil antenna (i.e., second coil antenna 216-4 or first coil antenna 216-2) is receiving the magnetic fields (not shown). For example, the magnetic flux is guided by the flux guide from the first coil antenna 216-2 to penetrate and exit at the second coil antenna 216-4, or vice-versa. The flux guide 218 may include a highly permeable material (e.g., ferrite material) that may be embedded in or mounted between the cascaded coil antenna 216 and the device 202. In other implementations, the flux guide 218 may be inserted through the cascaded coil antenna 216 to improve performance as discussed in FIGS. 3A and 4.

FIG. 3A illustrates an exemplary cascaded coil antenna 216 configuration to facilitate near field coupling. FIG. 3A illustrates the series connection between the first coil antenna 216-2 and the second coil antenna 216-4 to form the cascaded coil antenna 216 configuration. For example, the first coil antenna 216-2 may include a continuous loop of rectangular shape coil antenna that terminates at a positive terminal 300-2 and a negative terminal 300-4. Similarly, the same configuration (i.e., rectangular continuous loop) second coil antenna 216-4 may contain a positive terminal 300-6 and a negative terminal 300-8.

In an implementation, the series connection may include connecting the positive terminal 300-2 and the negative terminal 300-8 to an inner conductor 302-2 and a metallic shield 302-4, respectively, of a coaxial cable 302 (i.e., transmission line). In this implementation, another connecting wire 304 is used to connect or link the negative terminal 300-4 to the positive terminal 300-8 in order to complete the cascading of the two coil antennas and to form the cascaded coil antenna 216.

With continuing reference to FIG. 3A, the series connection that is implemented through the coaxial cable 302 and the connecting wire 304 may allow a an induced current 306-2 in the first coil antenna 216-2 to be opposite in direction to another induced current 306-4 in the second coil antenna 216-4. In other words, magnetic fluxes (not shown) produced by magnetic fields (not shown) during receiving mode in the cascaded coil antenna 216 may contain similar phase relationship such that, mutual magnetic fluxes aids one another. For example, the magnetic fluxes flow into the plane of the first coil antenna 216-2 in a perpendicular and inward direction. In this example, the guided magnetic fluxes flow into the plane of the second coil antenna 216-3 in a perpendicular and outward direction. At transmitting mode, the currents injected (not shown) in the cascaded coil antenna 216 may provide magnetic fields that add together during transmission.

Figure 3:
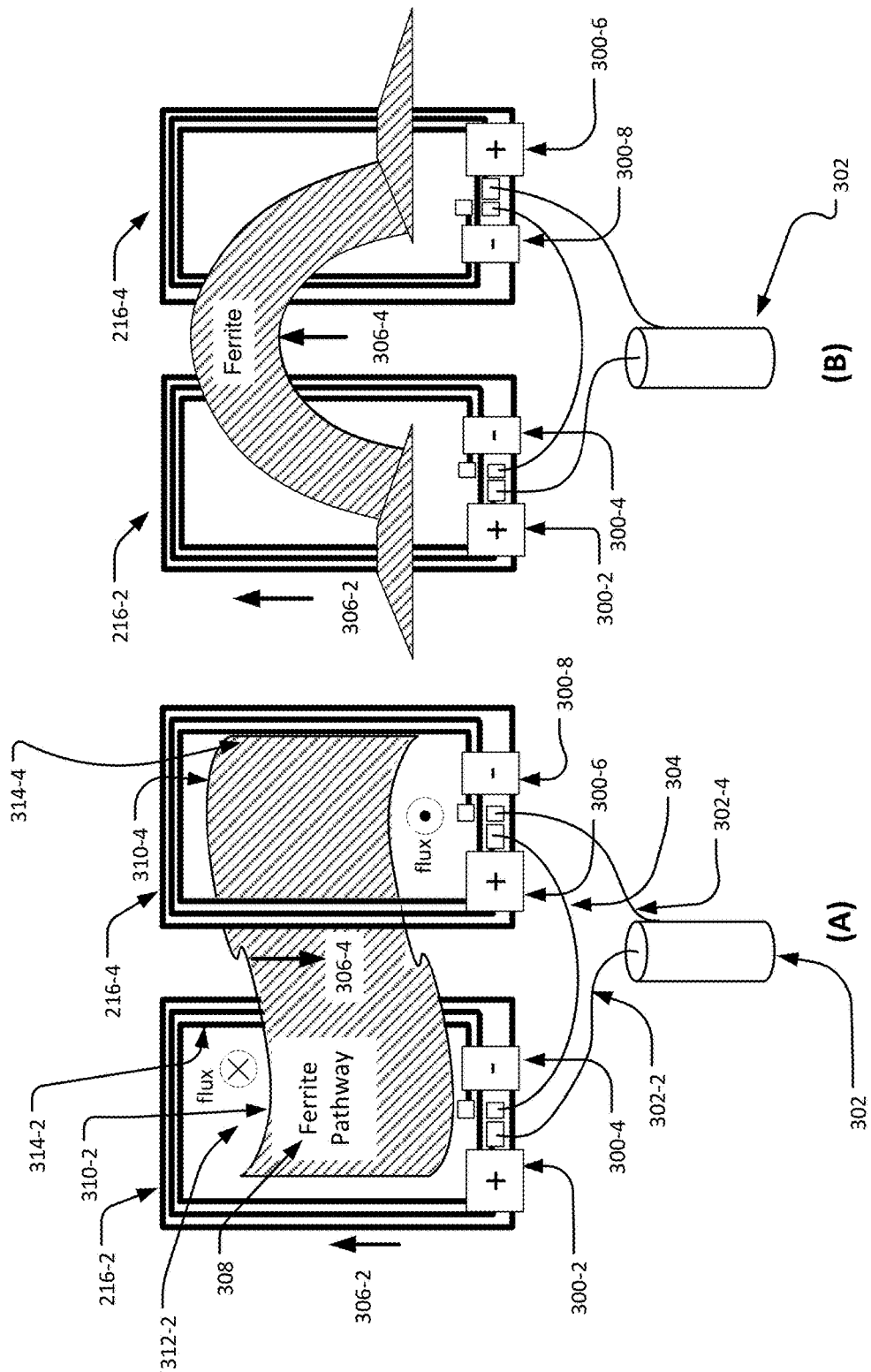
FIG. 3A illustrates an example cascaded coil antenna configuration in a portable device.
FIG. 3B illustrates an example cascaded coil antenna configuration to include a non-series connection.

In an implementation, the connection configuration in FIG. 3 may be used for both single ended and differentially fed coils. For example, for the single ended coils, the negative terminal 300-8 of the second coil antenna 216-4 and the metallic shield 302-4 are grounded. On the other hand, there is no explicit center tap to ground in differentially fed coils. The designation of the terminals as positive (+) and negative (−) is only to indicate polarity of induced voltage in each coil due to linking magnetic fluxes. In other words, the designation may correspond to dot convention used in transformer design.

In an implementation, a ferrite 308 may be configured to cover a top portion 310-2 of a FPC substrate 312-2. In this implementation, the FPG substrate 312-2 is where the first coil antenna 216-2 is integrated or built. The covered top portion 310-2 may extend or cover at least an inner area that is defined by inner perimeter of innermost loop 314-2 of the first coil antenna 216-2. In this implementation, the ferrite 308 may be extended to span or continue to the second coil antenna 216-4 that may be located at an opposite surface such as the rear side 220. In an implementation, the ferrite 308 may cover top portion 310-4 of the second coil antenna 216-4, which top portion 310-4 may be defined by the inner perimeter of innermost loop 314-4. In other words, the ferrite 308 may form like a letter "S" where the upper portion of the letter "S" covers the top portion 310-2, the middle portion of the letter "S" is the extension of the ferrite 308 extending to or going to the second coil antenna 216-4, and the bottom portion of the letter "S" covers the top portion 310-4 of the second coil antenna 216-2.

In an implementation, the ferrite 308 that forms the letter "S" configuration in covering the top portion 310 of the cascaded coil antenna 216 is placed in such a manner that it may receive majority of magnetic fluxes during receive mode or it may generate magnetic fields that aids one another during transmit mode.

FIG. 3B illustrates an example coil antennas 216 that includes a parallel notation or connection. FIG. 3B shows the cascaded coil antenna 216 that is not connected in series. In other words, similar to a configuration when connecting direct current (DC) supply voltages (not shown) in parallel, FIG. 3B shows the positive terminals 300-2 and 300-6 to connect with the inner conductor 302-2 and the metallic shield 302-4, respectively. With this connection, the magnetic fluxes may provide a different phase relationship on the cascaded coil antenna 216. To this end, there will be a subtraction of induced currents 306 since there is no aiding of the magnetic fluxes in the coil antennas 216. For example, at receive mode, the magnetic fluxes may induce the current 306-2 at the first coil antenna 216-2 in a clockwise direction. In this example, the guided magnetic fluxes at the second coil antenna 216-4 may generate another current 306-4 at the same clockwise direction following the parallel notation or connection of FIG. 3B. Accordingly, both currents 306-2 and 306-4 that may be induced by the magnetic fluxes may not add in phase, which may result in cancellation or minimization of coupling between the transmitting coil antenna (not shown) of the portable device 102-4 and the cascaded coil antenna 216 of the portable device 102-2.

Figure 4:
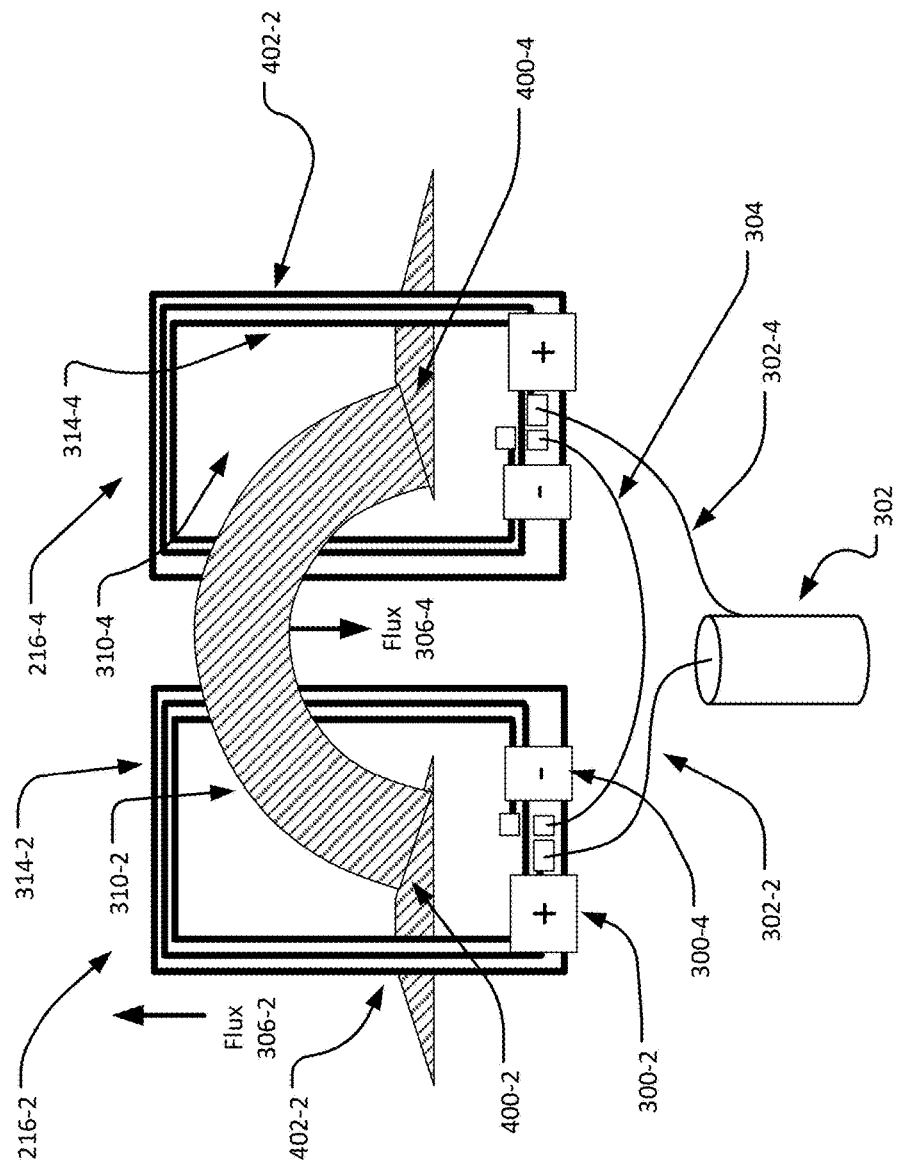
FIG. 4 illustrates an example cascaded coil antenna with a flux guide.

FIG. 4 illustrates an example cascaded coil antenna 216 that includes the ferrite 308 to preferentially guide the received magnetic fluxes (i.e., during receive mode) from the first coil antenna 216-2 to the second coil antenna 216-4. In an implementation, the ferrite 308 is configured to cover the top portion 310-2, which is similar to the area covered in FIG. 3A; however, an edge of the ferrite 308 is inserted through a slot 400-2 of the FPC substrate 312-2 and extends beyond an outermost loop 402-2 of the first coil antenna 216-2 in order to expand the area for receiving of the flowing magnetic fluxes to the plane of the first coil antenna 216-2.

With continuing reference to FIG. 4 and after covering the top portion 310-2, the ferrite 308 spans across the second coil antenna 216-4 and similarly terminates beyond outermost loop 402-4 of the second coil antenna 216-4 after passing through another slot 400-4. In this implementation, the induced currents 306 at receive mode and the generated magnetic fields at transmit mode as discussed in FIG. 3 may similarly apply. For example, the guided magnetic fluxes in the cascaded coil antenna 216 have the same phase relationship while the injected currents in the cascaded coil antenna 216 may provide the magnetic fields that add together during transmission.

Figure 5:
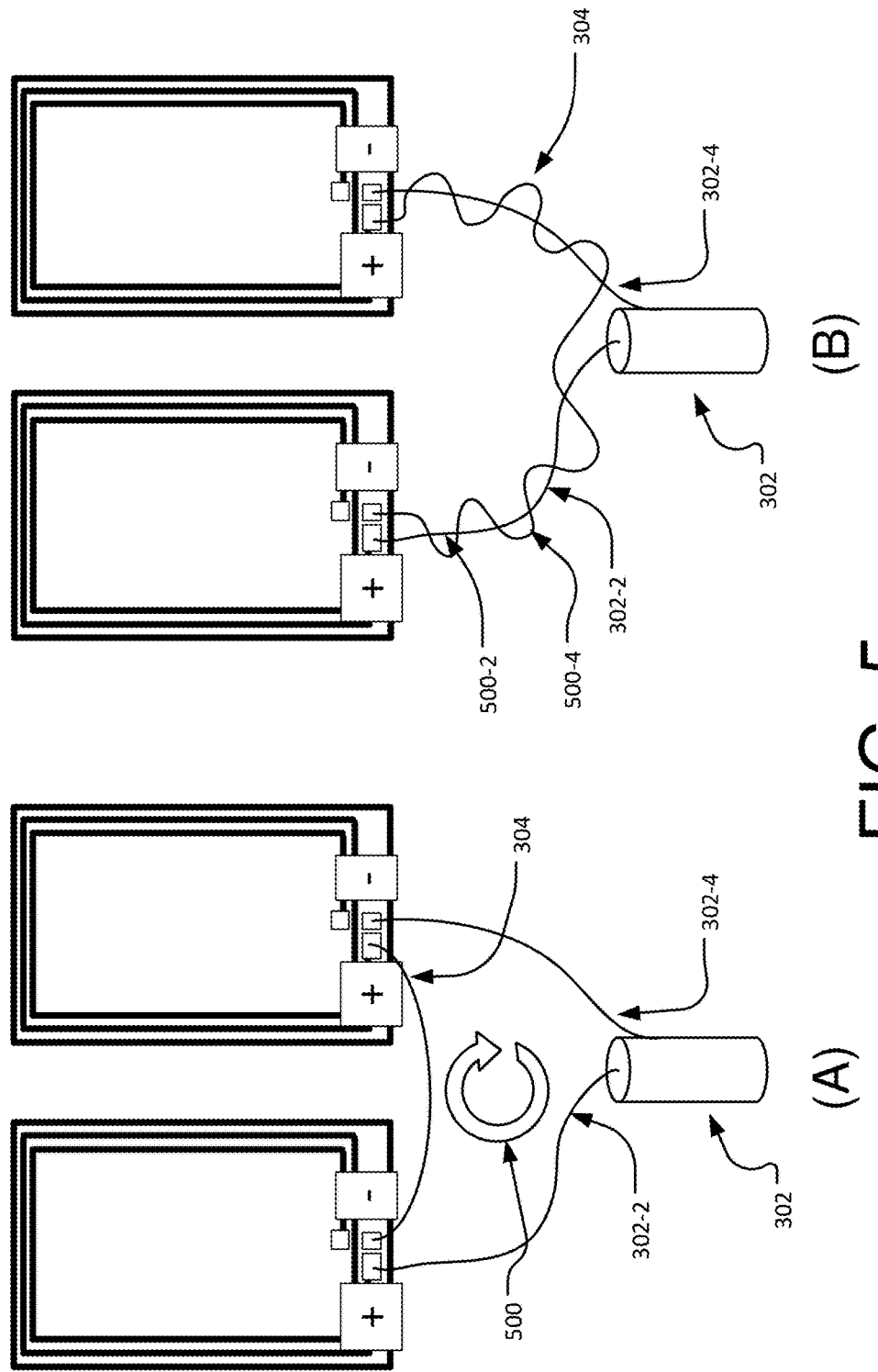
FIG. 5 illustrates different routing examples for cables in a cascaded coil antenna.
Figure 5C:
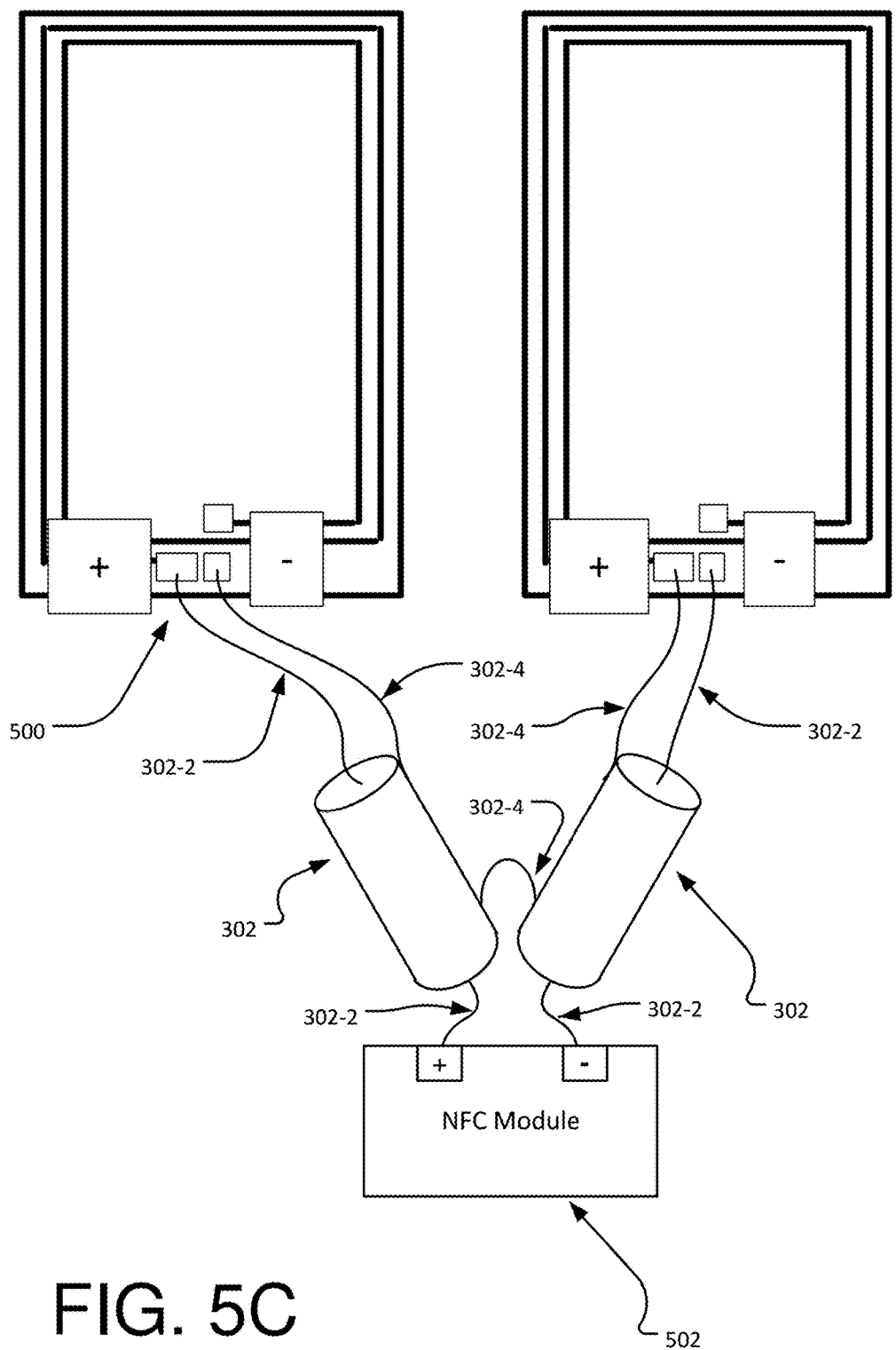

FIGS. 5A, 5B and 5C illustrate different routing of connecting wires to complete the cascaded coil antenna 216. In an implementation, FIG. 5A shows an area 500 that is defined or bounded by the inner conductor 302-2, metallic shield 302-4, and the connecting wire 304. In this implementation, a parasitic loop (not shown) may be produced by this configuration for which the efficiency of the cascaded coil antenna 216 may be affected. For example, the area 500 that is defined or bounded by the inner conductor 302-2, metallic shield 302-4, and the connecting wire 304 may act as a reflector or director to the cascaded coil antenna 216. Accordingly, implementations like the connecting wire routing configurations in FIGS. 5B and 5C may correct the presence of this parasitic loop.

In an implementation, FIG. 5B shows the connecting wire 304 that is curled or twisted to the metallic shield 302-4 and the inner conductor 302-2. In this implementation, the area 500 is minimized and accordingly, the parasitic loop (not shown) is correspondingly minimized. In other implementations, FIG. 5C shows the metallic shields 302-4 from two separate coaxial cables 302 acting as the connecting wire 304 in FIGS. 5A and 5B. In other words, the metallic shield 302-4 is used to connect the negative terminal 300-4 and the positive terminal 300-6 of the first and second coil antennas 216, respectively. In this configuration, the parasitic loop is minimized by the materials used for standard coaxial cable 302. For example, the area 500 in this configuration will be limited to area bounded by the inner conductor 302-2 and the metallic shield 302-4, which are very minimal in actual implementation.

With continuing reference to FIG. 5C, a single NFC module 502 may be used to process information or to control the cascaded coil antenna 216.

Figure 6:
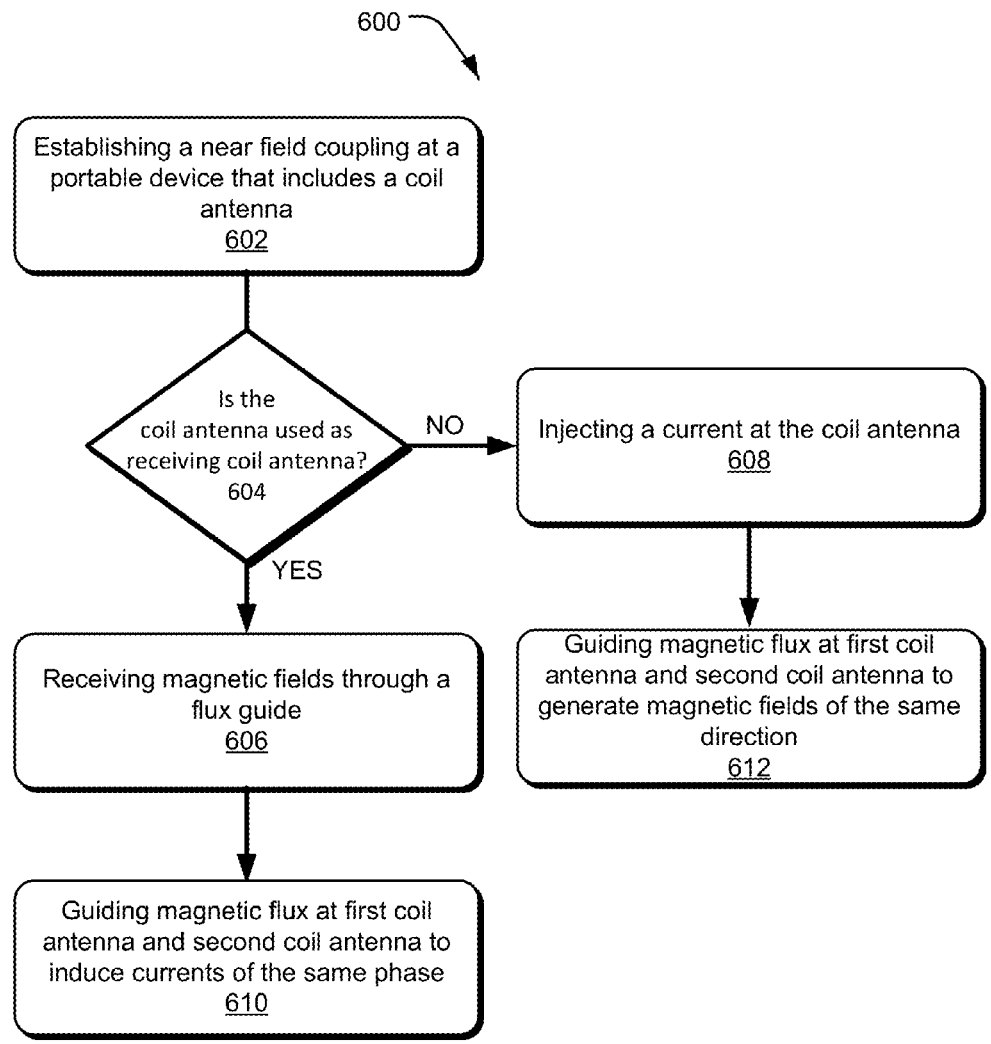
FIG. 6 is a method for coupling a portable device to facilitate near field coupling.

FIG. 6 shows an example process chart illustrating an example method for coupling a portable device to facilitate near field communications. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention.

At block 602, establishing a near field coupling at a portable device is performed. In an implementation, a first portable device (e.g., portable device 102-2) may establish near field coupling with a second portable device (e.g., portable device 102-4) by placing the portable device 102-2 at front side, rear side, top side, bottom side, right side, or a corner side of the portable device 102-4. In other implementations, the portable device 102-4 may establish near field coupling when accepting information from a credit card (e.g., credit card 104), an NFC tag (e.g., NFC tag 106), or other similar device when the credit card 104 or NFC tag 106 is placed at the front side (i.e., above the LCD screen), edge of a base, the rear side, bottom side, topside, or corner side of the portable device 102-2.

In an implementation, the portable device 102-2 may include a cascaded coil antenna (e.g., cascaded coil antenna 216) that contains an independent first coil antenna 216-2 that is cascaded or connected in series with another independent second coil antenna 216-4. In this implementation, the first coil antenna 216-2, which is located on a first surface (e.g., top surface 218), may be cascaded with the second coil antenna 216-4, which is located on a second surface (e.g., rear surface 220), through a connecting wire (e.g., coaxial cable 302).

In an implementation, both coil antennas 216 are cascaded by connecting in series their respective terminals (e.g., terminal 300). For example, a positive terminal (e.g., terminal 300-2) of the first coil antenna 216-2 and a negative terminal (e.g., terminal 300-8) of the second coil antenna 216-4 are connected to an inner conductor (e.g., inner conductor 302-2) and a metallic shield (e.g., metallic shield 302-4), respectively, of the coaxial cable 302. In this example, a negative terminal (e.g., terminal 300-4) of the first coil antenna 216-2 and a positive terminal (e.g., terminal 300-6) of the second coil antenna 216-4 are linked by another connecting wire such as the connecting wire 304 in order to complete the cascading coil antenna 216. In an implementation, the cascading configuration of the coil antennas 216 may provide reinforcing/adding of currents in the coil antennas 216 during receive mode while similar direction of magnetic fields are produced at transmit mode.

In an implementation, the first coil antenna 216-2 may be placed along palm rest of the portable device 102-2 while the second coil antenna 216-4 may be placed at bottom, at top, or corner of the portable device 102-2. In this implementation, a single NFC module (e.g., NFC module 502) may treat the coil antennas 216 as a single cascaded coil antenna 216. Furthermore, the cascaded coil antenna 216 may establish the near field coupling whether the portable device 102-2 is operated in a tablet mode, or in a clamshell mode.

In an implementation, a shield (e.g., ferrite 308) is installed at the first coil antenna 216-2 and spans up to the second coil antenna 216-4 to receive and guide the magnetic fluxes to provide the same phase relationship in the cascaded coil antenna 216. In this implementation, the ferrite 308 is configured as a letter "S" where the upper part and the bottom part of the letter "S" ferrite 308 configuration are used to cover top portions (e.g., top portion 310) of the first and second coil antennas 216-2 and 216-4, respectively. For example, the received magnetic fluxes are guided by the ferrite 308 through the second coil antenna 216-4 such that, the amount of current induced in this implementation is maximized.

At block 604, the cascaded coil antenna 216 may be used as a receiving cascaded coil antenna 216, or a transmitting cascaded coil antenna 216. For example, at receive mode such as in block 606, the portable device 102-2 may receive magnetic fluxes due to the magnetic fields that may be generated by another portable device 102-4. At transmit mode such as in block 608, the portable device 102-2 may inject current 306 at the cascaded coil antenna 216 to generate a magnetic field. The portable device 102 may control transmit and receive operation of its radio component that includes the cascaded coil antenna 216; however, the cascaded coil antenna 216 is a passive device. In other words, the separation of the transmit mode and the receive mode at block 604 is made to help explain the working mechanism in the present implementation. In actual implementations, both transmit and receive operations may be implemented at the same time in the cascaded coil antenna 216.

At block 610, guiding magnetic flux to induce a current of the same phase is performed. In an implementation, during the receive mode, the magnetic fluxes may be captured by a flux guide (e.g., flux guide 308) to induce a current (e.g., induced current 306). The flux guide 308 may facilitate the magnetic flux from the receiving coil antenna 216 (e.g., coil antenna 216-2) to penetrate and exit at the other coil antenna 216 (e.g., coil antenna 216-4) of the portable device 102.

In an implementation, the received magnetic fluxes at the first coil antenna 216-2 may induce a current 306-2 that flows in a clockwise direction. On the other hand, the facilitated magnetic fluxes at the second coil antenna 216-4 may induce another current 306-4 that flows in counter-clockwise direction. Accordingly, the induced currents are combined in phase by the cascaded coil antenna 216 to increase coupling coefficient between the transmitting coil antenna at the portable device 102-4, and the cascaded coil antenna 216 of the portable device 102-2.

At block 612, guiding magnetic flux to generate magnetic fields of the same direction is performed. In an implementation, during the transmit mode, the injected current flowing at the first coil antenna 216-2 and the second coil antenna 216-4 may generate the magnetic fields that will flow in the same direction.

Figure 7:
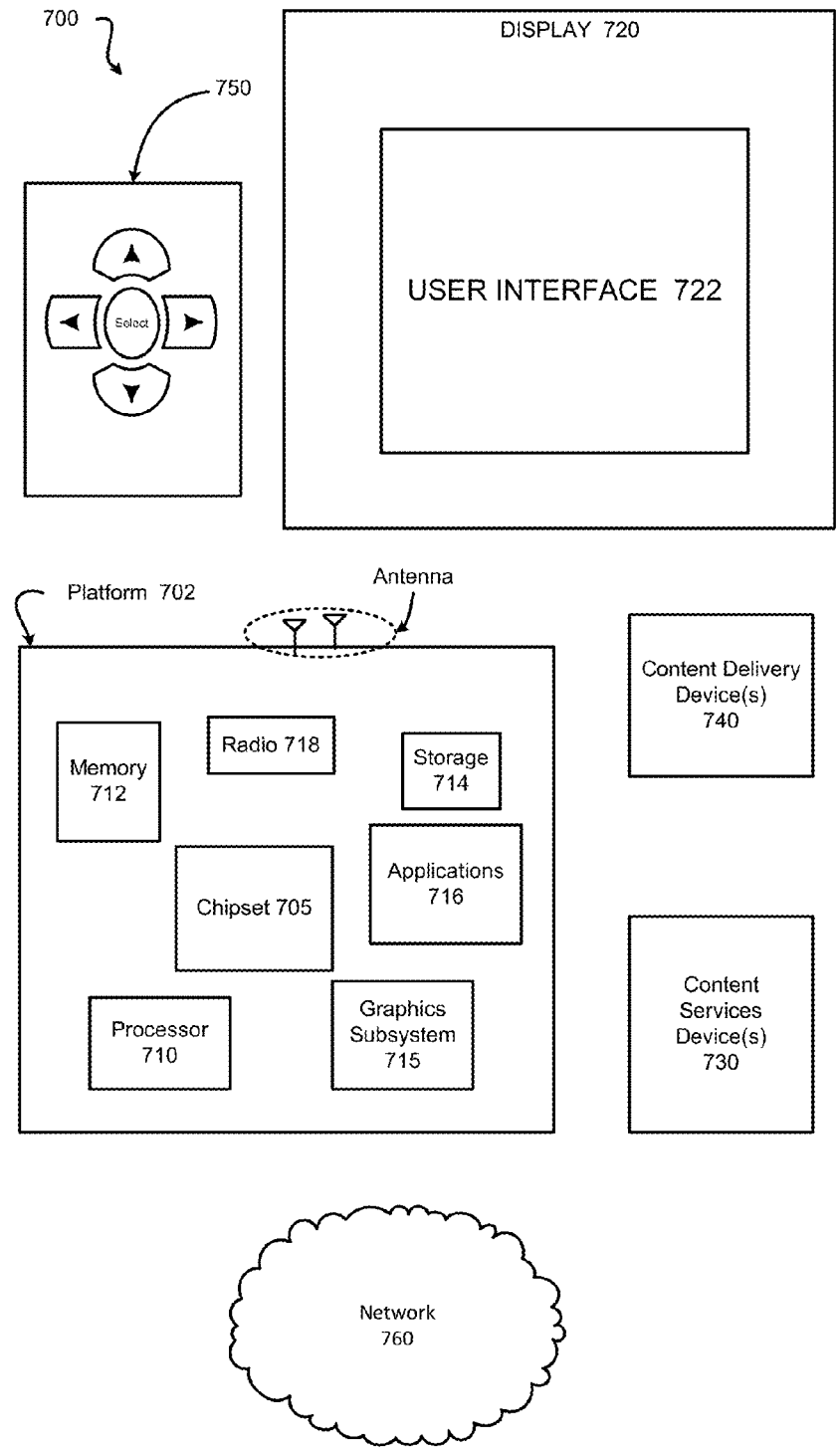
FIG. 7 is an illustrative diagram of an example system that implements cascaded coils for multi-surface coverage in near field communication.

FIG. 7 illustrates another example system 700 in accordance with the present disclosure. In various implementations, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 700 includes a platform 702 coupled to a display 720. Platform 702 may receive content from a content device such as content services device(s) 730 or content delivery device(s) 740 or other similar content sources. A navigation controller 750 including one or more navigation features may be used to interact with, for example, platform 702 and/or display 720. Each of these components is described in greater detail below.

In various implementations, platform 702 may include any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 710 may be dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 714 may include technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 may be integrated into processor 710 or chipset 705. In some implementations, graphics subsystem 715 may be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 718 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In various implementations, display 720 may include any television type monitor or display. Display 720 may include, for example, a computer display screen, touch screen display, video monitor, television-like device, and/or a television. Display 720 may be digital and/or analog. In various implementations, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In various implementations, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In various implementations, content services device(s) 730 may include a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be replicated on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but may be integrated into platform 702 and/or display 720. The present disclosure, however, is not limited to the elements or in the context shown or described herein.

In various implementations, drivers (not shown) may include technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 even when the platform is turned "off." In addition, chipset 705 may include hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the present disclosure.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 7.

As described above, system 700 may be embodied in varying physical styles or form factors. FIG. 8 illustrates implementations of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A smart phone, comprising:
   a near field communications (NFC) module;
   a coil antenna including a first coil and a second coil connected in series and disposed at different locations within the smart phone, and configured to transmit and receive near field communications (NFC) signals, the first coil having at least two concentric loops and the second coil having at least three concentric loops; and
   first and second coaxial cable conductors that couple the NFC module to the coil antenna, the first and second coaxial cable conductors having respective first and second center conductors and respective first and second metallic shields, wherein: a first end of the first coil is coupled to the NFC module by the first center conductor, a second end of the first coil is coupled to the first metallic shield, a first end of the second coil is coupled to the second metallic shield, a second end of the second coil is coupled to the NFC module by the second center conductor, and the first and the second metallic shields are coupled together by a conductor to couple the second end of the first coil to the first end of the second coil.

2. The smart phone of claim 1, wherein: the at least two concentric loops of the first coil surround a first area within the smart phone, the at least three concentric loops of the second coil surround a second area within the smart phone, and the first and second areas are located in substantially different areas within the smart phone.

3. The smart phone of claim 1, further comprising a display disposed on a front surface of the smart phone, wherein at least the first coil is disposed on a rear surface of the smart phone.

4. The smart phone of claim 1, wherein the first and the second coils are connected together in series via the first and second metallic shields and the conductor.

5. The smart phone of claim 1, further comprising a flux guide installed to cover a top of the first coil and span to a portion of the second coil, wherein the flux guide at receive mode is configured to generate magnetic flux at the first coil and the second coil to induce current of a same phase, and wherein the flux guide at transmit mode facilitates the magnetic flux at the first coil and the second coil to generate magnetic fields of a same direction.

6. The smart phone of claim 1, further comprising a camera mounted on a surface of the smart phone, wherein at least the first coil antenna is also mounted on the surface of the smart phone.

7. The smart phone of claim 1, further comprising a camera mounted on a surface of the smart phone, wherein at least the first coil is also mounted on the surface of the smart phone and wherein the first coil surrounds at least a portion of the camera.

8. A cellular telephone, comprising:
a cellular communications radio;
a near field communications (NFC) module;
a NFC coil antenna including first and second coils connected together in series and disposed at different locations within the cellular telephone, the first coil having at least two concentric loops and the second coil having at least three concentric loops; and
first and second coaxial cable conductors that couple together the NFC module and the NFC coil antenna, the first and second coaxial cable conductors having respective first and second center conductors and respective first and second metallic shields, wherein: a first end of the first coil is coupled to the NFC module by the first center conductor, a second end of the first coil is coupled to the first metallic shield, a first end of the second coil is coupled to the second metallic shield, a second end of the second coil is coupled to the NFC module by the second center conductor, and the first and the second metallic shields are coupled together by a conductor to couple the second end of the first coil to the first end of the second coil.

9. The cellular telephone of claim 8, further comprising a display disposed on a front surface of the smart phone, wherein at least the first coil is disposed on a rear surface of the smart phone.

10. The cellular telephone defined in claim 8, wherein the first and second coils are connected together in series via the first and second metallic shields and the conductor.

11. The cellular telephone of claim 8, further comprising a flux guide installed to cover a top of the first coil and span to a portion of the second coil, wherein the flux guide at receive mode is configured to generate magnetic flux at the first coil and the second coil to induce current of a same phase, and wherein the flux guide at transmit mode facilitates the magnetic flux at the first coil and the second coil to generate magnetic fields of a same direction.

12. The cellular telephone of claim 8, further comprising a camera mounted on a surface of the smart phone, wherein at least the first coil is also mounted on the surface of the smart phone.

13. The cellular telephone of claim 8, further comprising a camera mounted on a surface of the smart phone, wherein at least the first coil is also mounted on the surface of the smart phone and wherein the first coil surrounds at least a portion of the camera.

14. The cellular telephone of claim 8, wherein: the first coil is wrapped around a first area, the second coil is wrapped around a second area, and the first and second areas are substantially non-overlapping.

15. The cellular telephone of claim 8, wherein: the first coil is wrapped around a first area, the second coil is wrapped around a second area, and the first and second areas are located in different portions of the cellular telephone.

16. A smart phone, comprising:
a near field communications (NFC) module;
a coil antenna coupled to the NFC module, and including
a first coil and a second coil connected in series and disposed at different locations within the smart phone, wherein the coil antenna is configured to transmit and receive NFC signals, and wherein the first coil antenna includes at least two concentric loops, and the second coil antenna includes at least three concentric loops; and
a flux guide installed to cover a top of the first coil and span to a portion of the second coil, the flux guide at a receive mode being configured to generate magnetic flux at the first coil antenna and the second coil to induce current of a same phase, wherein the flux guide at a transmit mode facilitates the magnetic flux at the first coil and the second coil to generate magnetic fields of a same direction.

* * * * *